(12) United States Patent
John et al.

(10) Patent No.: US 8,574,667 B2
(45) Date of Patent: Nov. 5, 2013

(54) METHODS OF FORMING COATINGS UPON WELLBORE TOOLS

(75) Inventors: Hendrik John, Celle (DE); Erik Bartscherer, Saarbrucken (DE); Andreas Krafczyk, Celle (DE)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 13/204,380

(22) Filed: Aug. 5, 2011

(65) Prior Publication Data
US 2013/0032411 A1 Feb. 7, 2013

(51) Int. Cl.
*B05D 1/12* (2006.01)

(52) U.S. Cl.
CPC .............. *B05D 1/12* (2013.01); *B05D 2401/32* (2013.01)
USPC ........................................... 427/189; 427/456

(58) Field of Classification Search
CPC ............................... B05D 2401/32; B05D 1/12
USPC ......... 427/180, 189, 190, 191, 192, 195, 202, 427/205, 230–239, 407.1, 409, 446, 447, 427/453, 456
See application file for complete search history.

(56) References Cited

U.S. PATENT DOCUMENTS

| | | | |
|---|---|---|---|
| 3,012,881 A | 12/1961 | Cape | |
| 4,073,951 A | 2/1978 | Sargeant | |
| 6,849,338 B2 | 2/2005 | Clemens et al. | |
| 6,974,606 B2 | 12/2005 | DiMarzio et al. | |
| 7,255,328 B2 | 8/2007 | Hunter | |
| 7,487,840 B2 | 2/2009 | Gammage et al. | |
| 2006/0183841 A1 | 8/2006 | Aneja et al. | |
| 2007/0107908 A1 | 5/2007 | Vaidya et al. | |
| 2007/0173590 A1 | 7/2007 | Longo et al. | |
| 2008/0000689 A1 | 1/2008 | Peter | |
| 2008/0105438 A1* | 5/2008 | Jordan et al. | 166/376 |
| 2009/0114807 A1 | 5/2009 | Kirkwood et al. | |
| 2009/0272731 A1 | 11/2009 | Olding et al. | |
| 2009/0276158 A1 | 11/2009 | Kirkwood et al. | |
| 2010/0188080 A1 | 7/2010 | Kruspe et al. | |
| 2010/0201359 A1 | 8/2010 | Rottengatter | |
| 2013/0025941 A1* | 1/2013 | Kumar et al. | 175/57 |

FOREIGN PATENT DOCUMENTS

| | | |
|---|---|---|
| CN | 200720037743 | 5/2008 |
| EP | 0265839 A2 | 5/1988 |
| EP | 0761786 A2 | 7/2002 |
| GB | 708352 | 5/1954 |
| GB | 804179 | 11/1958 |
| JP | 09071735 A | 3/1997 |
| KR | 19910008563 B1 | 10/1991 |
| WO | 2006076341 A2 | 7/2006 |
| WO | 2008060405 A2 | 5/2008 |

OTHER PUBLICATIONS

Ceramer, Innovative High Performance Polymers and Additives, www.ceramer.com/2the_material/20_material.php, visited Jul. 21, 2011, 1 page.
International Search Report for International Application No. PCT/US2012/049453 dated Apr. 3, 2013, 4 pages.
International Written Opinion for International Application No. PCT/US2012/049453 dated Apr. 3, 2013, 6 pages.

* cited by examiner

*Primary Examiner* — William Phillip Fletcher, III
(74) *Attorney, Agent, or Firm* — TraskBritt

(57) ABSTRACT

A composition including a high temperature thermoplastic polymer and a filler material is disclosed. A method for forming a coating upon a wellbore tool includes forming a powder composition comprising a thermoplastic polymer and a filler material and applying the composition on the body surface. Wellbore tools having components coated with such compositions are also disclosed.

19 Claims, 4 Drawing Sheets

METHODS OF FORMING COATINGS UPON WELLBORE TOOLS

FIELD

Embodiments of the present disclosure relate to compositions used for forming a coating on an article and to methods used to provide a coating on a wellbore tool using such compositions.

BACKGROUND

Wellbores are formed in subterranean formations for various purposes including, for example, extraction of oil and gas from the subterranean formation and extraction of geothermal heat from the subterranean formation. Wellbores may be formed in a subterranean formation using a drill bit such as, for example, an earth-boring rotary drill bit. Different types of earth-boring rotary drill bits are known in the art including, for example, fixed-cutter bits (which are often referred to in the art as "drag" bits), rolling-cutter bits (which are often referred to in the art as "rock" bits), diamond-impregnated bits, and hybrid bits (which may include, for example, both fixed cutters and rolling cutters). The drill bit is rotated and advanced into the subterranean formation. As the drill bit rotates, the cutters or abrasive structures thereof cut, crush, shear, and/or abrade away the formation material to form the wellbore. A diameter of the wellbore drilled by the drill bit may be defined by the cutting structures disposed at the largest outer diameter of the drill bit.

The drill bit is coupled, either directly or indirectly, to an end of what is referred to in the art as a "drill string," which comprises a series of elongated tubular segments connected end-to-end that extends into the wellbore from the surface of the formation. Various tools and components, including the drill bit, may be coupled at the distal end of the drill string at the bottom of the wellbore being drilled. This assembly of tools and components is referred to in the art as a "bottom hole assembly" (BHA).

Wirelines can also be used in a wellbore as part of drilling operations or during post-drilling operations. A "wireline" or "slickline," both terms used in the art, comprises a long wire or cable used to lower and raise downhole tools used in oil and gas wells for various purposes. Conductors for providing power and transmitting data may be incorporated in wirelines.

Coiled tubing, which comprises a thin-walled, highly flexible, continuous metal conduit that is transported to a well site and fed into a well bore from a reel, may be used in lieu of wireline for the same, and addition purposes.

A drill string, wireline, coiled tubing and/or a BHA may be used to deploy, or may include, a number of components in addition to the aforementioned components, including without limitation drill pipe, drill collars, stabilizers, measuring-while-drilling (MWD) equipment, logging-while-drilling (LWD) equipment, downhole communication modules, detectors, and other components. MWD/LWD and other wellbore tools may be disposed in an existing wellbore for, among other operations, completing, testing, stimulating, producing, and remediating hydrocarbon-bearing formations.

MWD/LWD tools are typically designed to determine or monitor downhole conditions or parameters. These tools may be configured to determine formation parameters, including, among other things, the resistivity, porosity, and permeability of the rock formation surrounding the wellbore drilled for recovering hydrocarbons. MWD/LWD tools may also be configured to measure the diameter of the borehole or the temperature, pressure, and humidity in the wellbore.

Because of the prolonged contact of wellbore tools with pressurized, solids-laden fluids and debris, and with the wall of the wellbore, in addition to the generally harsh conditions of a downhole location in terms of temperature and often-corrosive fluids, when drilling, completing, testing, stimulating, producing or remediating a wellbore, surfaces of drill bits, drill strings, tool strings, wirelines, MWD/LWD tools, and components thereof become damaged due to erosion, abrasion, and/or corrosion. Damage may occur on interior and/or exterior surfaces of such components. Damage may lead to premature failure of components and to additional costs associated with removal and repair or replacement of damaged components. Coatings are often provided on wellbore tools to protect the tools from the harsh environments in which they are used.

BRIEF SUMMARY

In some embodiments, the present disclosure includes a composition comprising a high temperature thermoplastic polymer and a filler material. The high temperature thermoplastic polymer comprises 10 weight percent to 99.9 weight percent of the composition, and the filler material comprises 0.1 weight percent to 90 weight percent of the composition.

In other embodiments, the present disclosure includes a method for forming a coating upon a wellbore tool. The method includes forming a powder thermal composition comprising a thermoplastic polymer and a filler material. The method further includes applying the powder composition on the body surface.

In other embodiments, the present disclosure includes wellbore tools comprising a body surface and a coating covering at least a portion of the body surface. The coating comprises a high temperature thermoplastic polymer and a filler material.

BRIEF DESCRIPTION OF THE DRAWINGS

While the specification concludes with claims particularly pointing out and distinctly claiming what are regarded as embodiments of the disclosure, various features and advantages of this disclosure may be more readily ascertained from the following description of example embodiments provided with reference to the accompanying drawings.

DETAILED DESCRIPTION

Figure 1A:
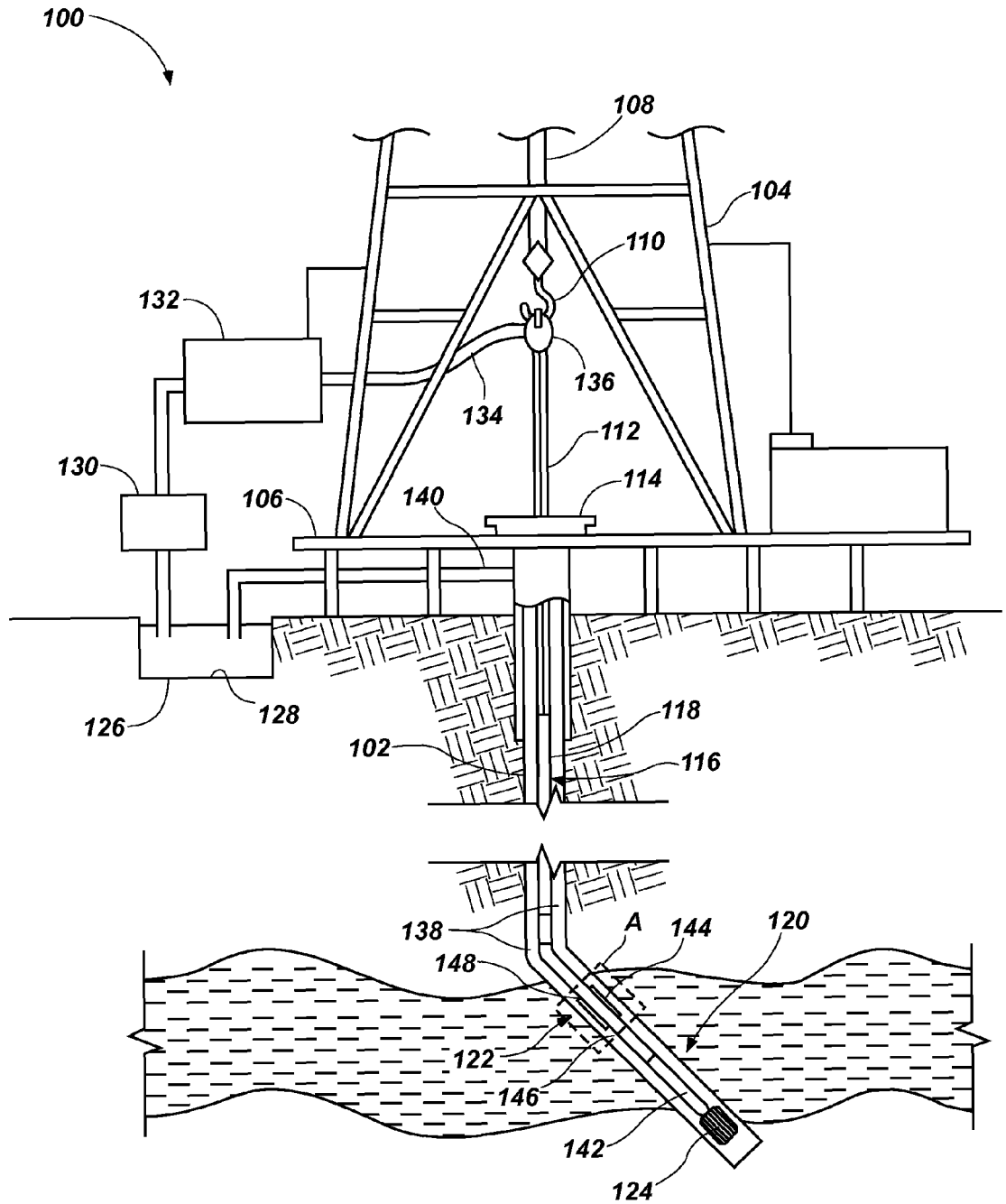
FIG. 1A is a schematic of a drilling system including a wellbore tool having a coating in accordance with a first embodiment of the present disclosure.

As used herein, the term "body" means and includes a structural element of an article. The body may comprise any of a number of materials, such as a polymer material, a ceramic material, a metal material, or a composite material. The body may be, for example and without limitation, a solid mass, a wall, a floor, a housing, a layer already on an object, etc.

As used herein, the term "wellbore system" means and includes any grouping of inter-communicable or interactive tools configured for use in testing, surveying, drilling, enlarging, logging, completing, sampling, monitoring, utilizing, maintaining, repairing, etc., a bore. Wellbore systems include, without limitation, on-shore systems, off-shore systems, systems utilizing a drill string, systems utilizing a wireline, and systems using coiled tubing.

As used herein, the term "wellbore tool" means and includes any article, tool or component to be used within a wellbore in a subterranean formation. Wellbore tools include, without limitation, tools and components used in testing, surveying, drilling, enlarging, completing, logging, sampling, monitoring, utilizing, maintaining, repairing, etc., a wellbore. A wellbore tool may include, without limitation, a logging-while-drilling (LWD) tool or a measuring-while-drilling (MWD) tool.

As used herein, the terms "wellbore" and "borehole" mean a man-made conduit formed in or through a subterranean formation or series of formations for any purpose, such as extraction of oil or gas from the subterranean formation, or extraction of geothermal heat from the subterranean formation. "Wellbore" and "borehole" may be used interchangeably, unless otherwise specified.

As used herein, the term "thermoplastic polymer" means and refers to a polyolefin, a vinyl, a polyvinyl ether, a polyvinyl thioether, a polyvinyl alcohol, a polyvinyl ketone, a polyvinyl halide, a polyvinyl nitrile, a polyvinyl ester, a polyamide, a polyaramide, a polyamideimide, a polyimide, a polyetherimide, a polyester, a polythioester, a polyester alloy, a nylon, a poly(vinylidene fluoride), a polyether amide, a polyetherketone, a polyetheretherketone, a polyetherketoneketone, a polysulfone, a polysulfonamide, a polyarylsulfone, a polyethersulfone, a polysulfonate, a polysulfide, a polyarylate, a polyarylene sulfide, a polyphenylene sulfide, a polyalkyd, a polystyrene, a polyurea, a polyurethane, a polytetrafluoroethylene, a polybenzoxazole, a polyoxadiazole, a polybenzothiazinophenothiazine, a polybenzothiazole, a polypyrazinoquinoxaline, a polypyromellitimide, a polyquinoxaline, a polybenzimidazole, a polyoxindole, a polyoxoisoindoline, a polydioxoisoindoline, a polytriazine, a polypyridazine, a polypiperazine, a polypyridine, a polypiperidine, a polytriazole, a polypyrazole, a polycarborane, a polyoxabicyclononane, a polydibenzofuran, a polyphthalide, a polyacetal, a polyanhydride, a polyphosphazene, and a polysilazane, and further includes an oligomer, copolymer, block copolymer, ionomer, polymer blend, or combination thereof.

As used herein, the term "high temperature polymer" means and includes, without limitation, polymers formulated to withstand, without substantial degradation over a time period of at least twenty-four hours, temperatures exceeding 200 degrees Celsius. High temperature polymers include, without limitation, high temperature thermoplastic polymers and high temperature thermoset plastic polymers.

As used herein, the term "high temperature thermoplastic polymer" means and includes, without limitation, PEEK (polyetheretherketone); PEK (polyetherketone); PFA (perfluoroalkoxy); PTFE (polytetrafluoroethylene); FEP (fluorinated ethylene propylene); CTFE (polychlorotrifluoroethylene); PVDF (polyvinylidene fluoride); PA (polyamide); PE (polyethylene); TPU (thermoplastic elastomer); PPS (polyphenylene sulfide); PESU (polyethersulfone); PC (polycarbonate); PPA (polyphthalamide); PEKK (polyetherketoneketone); TPI (thermoplastic polyimide); PAI (polyamide-imide); and PI (polyimide); and further includes an oligomer, copolymer, block copolymer, ionomer, polymer blend, or combination thereof.

As used herein, the term "fullerene" means a carbon-based molecule in which the carbon atoms are arranged in pentagonal and/or hexagonal shapes. Fullerenes exist in many different configurations including, for example, planar sheets (e.g., graphene), nanotubes (e.g., "buckytubes," as they are sometimes referred to in the art), spheroids (e.g., "buckyballs," as they are sometimes referred to in the art), nanobuds, megatubes, polymers, nano-"onions," linked "ball-and-chain" dimers, and rings.

As used herein, the term "micro-encapsulated material" means a material comprising microcapsules having a core, internal phase, or fill comprising a first material and a shell, coating, or membrane comprising a second material, the micro-encapsulated material being configured to release the first material encapsulated within the core upon rupture of the shell.

As used here in the term "liquid" means and includes a pourable or otherwise substantially flowable material, without regard to a specific viscosity or proportions of constituents of the material. For example, a liquid, as the term is used herein, may include molten materials and/or may include particulate or other non-dissolved material in suspension, including without limitation, suspensions of high volumes of non-dissolved materials, commonly termed "slurries."

The illustrations presented herein are not meant to be actual views of any particular method, tool, component, structure, device, or system, but are merely idealized representations that are employed to describe embodiments of the present disclosure.

The following description provides specific details, such as material types, material percentages, and processing conditions in order to provide a thorough description of embodiments of the disclosed compositions and methods. However, a person of ordinary skill in the art will understand that the embodiments of the compositions and methods may be practiced without employing the specific details. Indeed, the embodiments of the compositions and methods may be practiced in conjunction with conventional techniques employed in the industry.

Reference will now be made to the drawings, wherein like numerals refer to like components throughout. The drawings are not necessarily drawn to scale.

FIGS. 1A through 5B illustrate various wellbore tools, segments thereof, or components thereof having a coating, according to embodiments of the disclosure. The coatings may be formed using a composition of at least one polymer and at least one filler material. Upon heating, the composition melts, fowling a sprayable liquid composition that may be applied to the surface of a tool body to form a coating thereon. Alternatively, upon heating, the composition melts, sintering the composition to form a coating upon the surface of a tool body.

The composition may be a thermal spray composition formulated for use within a thermal spraying system. A "thermal spraying" system utilizes a process in which a coating material feedstock (e.g., the thermal spray composition) is heated and propelled as individual droplets, which may also be characterized as particles, onto the surface of a body or other substrate. The coating material is heated by the applicator (e.g., a thermal spray gun) by using combustible gas, plasma flame, or electric hot air to heat and melt the particles of the material feedstock into droplets, which are propelled out of the spray gun by compressed gas. When the coating material particles strike the substrate to be coated, they flatten, flow, and meld into adjacent particles to form a continuous film. The film coats the surface, providing the coating. Thermal spraying processes include, without limitation, processes in which metallic materials, ceramic materials, cermet (i.e., a composite of ceramic and metallic) materials, polymeric materials, or combinations thereof, in the form of powders, wires, or rods, are fed to the applicator with which they are heated to near or somewhat above their melting points. Thermal spraying may include one or more applications of sprayed coatings upon the surface of the article to be coated.

The thermal spray composition may include a high temperature thermoplastic polymer and a filler material. The high temperature thermoplastic polymer may comprise 10 weight percent to 99.9 weight percent of the composition, and the filler material may comprise 0.1 weight percent to 90 weight percent of the composition. The filler material may comprise an electrically nonconductive material. Such a thermal spray composition may be formulated to provide electrical insulation to the coated tool. The filler material may alternatively, or additionally, comprise a thermally nonconductive filler material. Such a thermal spray composition may be formulated to provide thermal insulation to the coated tool. The filler material may alternatively comprise a conductive material.

The thermal spray composition may comprise a powder having an average particle diameter of less than or equal to 250 micrometers. For example, the particles of the thermal spray composition may have an average particle diameter substantially equal to 180 micrometers. The high temperature thermoplastic polymer may include polytetrafluoroethylene and the filler material may include polyphenylene sulfone. Polytetrafluoroethylene may comprise between about 70 weight percent to 98 weight percent of the thermal spray composition, and polyphenylene sulfone may comprise between about 2 weight percent and 30 weight percent of the thermal spray composition. For example, without limitation, polytetrafluoroethylene may comprise about 88 weight percent to 98 weight percent of the thermal spray composition, and polyphenylene sulfone may comprise between about 2 weight percent and 12 weight percent of the thermal spray composition. In addition, for example, without limitation, polytetrafluoroethylene may comprise about 90 weight percent and polyphenylene sulfone may comprise about 10 weight percent of the thermal spray composition. Polyphenylene sulfone may include a commercially available material sold under the name CERAMER® or CERAMERPLUS, available from Ceramer GmbH of Bayreuth, Germany. The thermal spray composition may therefore be formulated to increase the pressure, erosion and abrasion resistance of a coating formed using the composition.

The thermal spray composition may include polyetheretherketone, a high temperature thermoplastic polymer, and aluminum oxide, a nonconductive filler material. Polyetheretherketone may comprise about 10 weight percent to 95 weight percent of the thermal spray composition. Aluminum oxide may comprise about 5 weight percent to 90 weight percent of the thermal spray composition. For example, without limitation, polyetheretherketone may comprise 20 weight percent and aluminum oxide may comprise 80 weight percent of the thermal spray composition. Polyetheretherketone may include a commercially available material sold under the name EVONIK VESTAKEEP® AR1056, available from Evonik Industries AG of Essen, Germany. The thermal spray composition may, therefore, be formulated to increase the abrasion and erosion resistance and the mechanical stability of a coating formed using the composition when the coating is subjected to increased pressure. A coating formed from a composition including 20 weight percent polyetheretherketone and 80 weight percent aluminum oxide was found to withstand loads of 1100 MPa without damage. A tool provided with a coating formed from a composition including between 0.5 and 50 weight percent polyetheretherketone and between 50 and 99.5 weight percent aluminum oxide may exhibit two to ten times higher abrasion resistance than the same tool without a coating.

The thermal spray composition may include a polymer and a lubricant filler material. The lubricant filler material may comprise a dry-film lubricant. For example, without limitation, the thermal spray composition may include boron nitride, a nonconductive, lubricant filler material. The thermal spray composition may include polyetheretherketone and boron nitride. Polyetheretherketone may comprise about 70 weight percent to 90 weight percent of the thermal spray composition. Boron nitride may comprise about 10 weight percent to 30 weight percent of the thermal spray composition. For example, without limitation, polyetheretherketone may comprise 80 weight percent and boron nitride may comprise 20 weight percent of the thermal spray composition. Boron nitride may be hexagonal boron nitride. The thermal spray composition may, therefore, be formulated to decrease friction between a surface provided with a coating formed using the composition and an interfacing surface. A tool provided with a coating framed from such a composition may exhibit reduced friction and wear by two to five times that of the same tool without a coating.

The nonconductive filler material within the thermal spray composition may comprise a filler material having a glass transition temperature greater than the melting point of the high temperature thermoplastic polymer. The glass transition temperature may be greater than or equal to about 350 degrees Celsius. For example, without limitation, the filler material may comprise a polyphenylene sulfone polymer having a glass transition temperature of 360 degrees Celsius. In such embodiments, the polymer may be polyetheretherketone, having a melting point of approximately 343 degrees Celsius, such that the polyphenylene sulfone polymer filler material has a glass transition temperature greater than the melting point of the polyetheretherketone. Such a composition is formulated to improve tribological properties of a coating formed using the composition. The coating formed using the composition may, therefore, be suitable for use to protect surfaces intended for interfacing with another surface. A tool provided with a coating formed from such a composition may exhibit reduced friction and wear by two to five times that of the same tool without a coating.

The filler material of the thermal spray composition may include more than one filler material. For example, without limitation, the filler material may include both a lubricant filler material and a high glass transition temperature filler material. For example, without limitation, the filler material may include both boron nitride and polyphenylene sulfone. The filler material may include polyphenylene sulfone in about 1 weight percent to 10 weight percent of the thermal spray composition and boron nitride in about 1 weight percent to 10 weight percent of the thermal spray composition. For example, without limitation, the thermal spray composition may comprise about 90 weight percent high temperature thermoplastic polymer, about 5 weight percent boron nitride, and about 5 weight percent polyphenylene sulfone. A tool provided with a coating formed from such a composition may exhibit reduced friction and wear by two to five times that of the same tool without a coating.

The composition may alternatively, or additionally, include more than one polymer. Polymers within the composition may include thermoplastic polymers. Polymers within the composition may include thermoplastics that are not high temperature thermoplastic polymers.

The composition may alternatively or additionally include more than one filler material. Filler materials included within the composition may be electrically conductive or non-electrically conductive, thermally conductive or non-thermally conductive, metallic or nonmetallic, organic or inorganic, etc. Conductive filler materials may include, without limitation, uncoated fullerenes, including those structured as planar sheets (e.g., graphene), nano tubes (e.g., buckytubes, carbon nanotubes), spheroids (e.g., buckyballs), nanobuds, megatubes, polymers, nano-onions, linked ball-and-chain dimers, and rings. A filler material within the composition may include carbon nanotubes.

The filler material may include a coated material, such as, without limitation, a micro-encapsulated material. For example, silicate-coated aluminum flakes may be included as a filler material within the coating mixture such that the resulting coating is formulated to protect against corrosion. The filler material may, alternatively or additionally, comprise a micro-encapsulated lubricant. Micro-encapsulated material may allow inclusion of a substance within the composition that, without encapsulation, might otherwise interfere with the polymer within the composition. For example, where the surface to be coated is one that is to interface with another surface, a micro-encapsulated graphite lubricant may be included in the composition. Following coating of the surface, the coated surface will interface with its counterpart surface and mechanically release the encapsulated graphite, providing the graphite lubricant without risking undesirable interaction of the graphite lubricant material with the properties of the polymer or other filler materials within the composition before application on the surface.

The filler materials may comprise micro-particles, comprising solids having an average particle size less than 1 millimeter. For example, the filler material may comprise a powdered solid having an average particle diameter of between 150 micrometers and 200 micrometers, inclusive. The filler materials may comprise nano-particles, comprising solids having an average particle size less than 1 micrometer.

Additional or alternative filler materials may include, without limitation, alumina, carbon black, silica, silicate, calcium carbonate, magnesium carbonate, kaolin, dolomite, chalk, feldspars, mica, barium sulfate, or a combination thereof.

With reference to FIGS. 1A through 5B, a method for forming a coating upon an article, such as a wellbore tool, includes forming a tool body having a body surface. Forming a tool body may include forming a wellbore tool or a component thereof. For example, without limitation, forming the tool body may include forming any component of the drilling system 100 depicted in FIGS. 1A and 1B; the tool segments 200, 300 depicted in FIGS. 2 and 3, respectively; the well logging instrument 400 depicted in FIG. 4; the MWD/LWD tool segment depicted in FIGS. 5A and 5B; or the like.

The method for forming a coating upon an article further includes forming a powder thermal composition comprising a thermoplastic polymer and a filler material. Forming the powder thermal composition may include liquefying the thermoplastic polymer, for example, without limitation, by heating the thermoplastic polymer past its melting point, by dissolving the thermoplastic polymer within a solvent, or by suspending non-dissolved thermoplastic polymer particles within a fluid. Forming the powder thermal composition may further include adding the filler material of the composition to the liquefied thermoplastic polymer.

Forming the powder thermal composition may alternatively, or additionally, include agglomerating the thermoplastic polymer and the filler material. Agglomeration is a process in which individual particulates of solid materials are caused to associate into aggregate particles of larger size. Agglomeration may include adding individual particulates of solid materials to a liquid agglomerating agent, i.e., a liquid that will wet the particle surfaces in such manner as to promote inter-particle adherence when the particles are agitated. The liquid agglomerating agent may comprise water or another solvent, introduced as a spray, a mist, or in the form of vapor.

Forming the powder thermal composition may alternatively, or additionally, include physically mixing the thermoplastic polymer and the filler material together. For example, the thermoplastic polymer and the filler material may each be ground from a separate, solid mass of material to powder that may then be mixed together to form one amount of combined powder.

Forming the powder thermal composition of a polymer and filler material may include coating one with the other. For example, the powder thermal composition may be formed by coating a polymer onto particles of filler material. As another example, the powder thermal composition may be formed by coating particles of the polymer with a filler material. The resulting polymer-coated filler material or filler-coated polymer material forms a powder thermal composition of a polymer and filler material.

Forming the powder thermal composition may include forming finely particularized solids having an average particulate size between 150 micrometers and 200 micrometers. For example, forming the powder thermal composition may include forming a powder composition having an average particulate size substantially equal to 180 micrometers.

The method for forming a coating upon an article such as a wellbore tool may further include heating the body surface of the tool body to be coated and applying the powder thermal composition on the body surface. Heating the body surface may be performed before and/or after applying the powder thermal composition on the body surface.

Applying the powder thermal composition on the body surface of the tool may be accomplished using the aforementioned thermal spraying technique. This may include flame spraying molten powder thermal composition upon the body surface. Heating the body surface may be accomplished prior to, during, and/or after flame spraying the composition upon the surface. For example, before applying the composition to the surface, the surface may be heated to a temperature not less than 10 degrees Celsius below the melting point of the polymer within the composition. For example, the surface may be heated to a temperature that is substantially at the melting point of the polymer within the composition, and then the thermal spray composition may be flame sprayed upon the surface.

Applying the powder thermal composition on the body surface of the tool may alternatively, or additionally, be accomplished by electrostatically dispersing the powder thermal composition upon the body surface. Electrostatically dispersing the composition involves supplying a charge to the powder particles, injecting the charged powder into an enclosure having an open volume, exposing a surface of the tool to the open volume within the enclosure containing the powder, and thereafter depositing the powder on the surface of the tool due to the charge of the particles. The process may further include oppositely charging the surface of the tool before exposing it to the open volume. After electrostatically dispersing the composition onto the body surface, the body surface of the tool, including the dispersed powder thermal composition may be heated to sinter or otherwise melt the powder thermal composition and form a unified coating upon the surface of the tool body. The electrostatic dispersal may alternatively or additionally include preheating the body surface of the tool before exposing the surface to the charged powder particles.

Applying the powder thermal composition may alternatively, or additionally, utilize a solvent. In addition to forming the powder thermal composition, a liquid coating mixture may be formed by adding the powder thermal composition to a solvent, such as a liquid solvent. The solvent may comprise methyl ethyl ketone, toluene, or the like. Applying the composition may, therefore, include applying a liquid coating mixture of the powder thermal composition and solvent on the body surface of the tool. Applying the liquid coating mixture on the body surface of the tool may be accomplished by conventional coating methods such as, without limitation, painting, spraying, dip coating, and the like. Thereafter, heating the body surface of the tool may sinter the powder thermal composition to form a unified coating upon the surface. Prior to heating or during heating, the solvent within the liquid coating mixture may be allowed to evaporate or driven to evaporate from the mixture.

FIG. 1A illustrates a drilling system including wellbore tools having a coating. The drilling system is configured to include a MWD/LWD system. A borehole 102 is drilled into the earth under control of surface equipment that includes a rotary drilling rig. In accordance with a conventional arrangement, the rig includes a derrick 104, derrick floor 106, draw works 108, hook 110, kelly joint 112, rotary table 114, and drill string 116. The drill string 116 includes drill pipe 118 secured to the lower end of the kelly joint 112 and to the upper end of a section comprising a plurality of drill collars. The drill collars may include an upper drill collar, an intermediate sub drill collar, and lower drill collar BHA 120 situated immediately below the intermediate sub drill collar. The lower end of the lower drill collar BHA 120 carries a wellbore tool 122 and a drill bit 124.

Drilling fluid 126 is circulated from a mud pit 128 through a mud pump 130, past a desurger 132, through a mud supply line 134, and into a swivel 136. The drilling fluid 126 flows down through the kelly joint 112, through a longitudinal central bore 150 (FIG. 1B) in the drill string 116, and through jets (not shown) in the lower face of the drill bit 124. Return fluid 138 containing drilling mud, cuttings, and formation fluid flows back up through the annular space between the outer surface of the drill string 116 and the inner surface of the borehole 102 to be circulated to the surface where it is returned to the mud pit 128 through a mud return line 140. A shaker screen (not shown) separates formation cuttings from the drilling mud before the mud is returned to the mud pit 128.

The drill string 116 may include a downhole drill motor 142 for rotating and operating the drill bit 124. The drilling system 100 and/or the drill string 116 of the drilling system 100 may also include various sensors and LWD/MWD devices configured to provide information about the formation, downhole drilling parameters, and/or the mud motor. The lower drill collar BHA 120 may be modular in construction in that various devices are interconnected sections, joining at interfacing surfaces, so that the individual sections may be replaced when desired.

The lower drill collar BHA 120 may include a wellbore tool 122 having a nuclear device (e.g., the devices depicted in FIGS. 2 and 3) for providing information useful for evaluating and testing subsurface formations along the borehole 102. The nuclear device may be part of a LWD/MWD system.

Any of the surfaces of the components of the drilling system 100 of FIG. 1A may be provided with a coating formed by any of the aforementioned coating methods and including a composition including any of the aforementioned compositions. For example, components described as including interfacing surfaces may be provided with a coating formed of a composition including a high temperature thermoplastic polymer and a lubricant filler material.

Figure 1B:
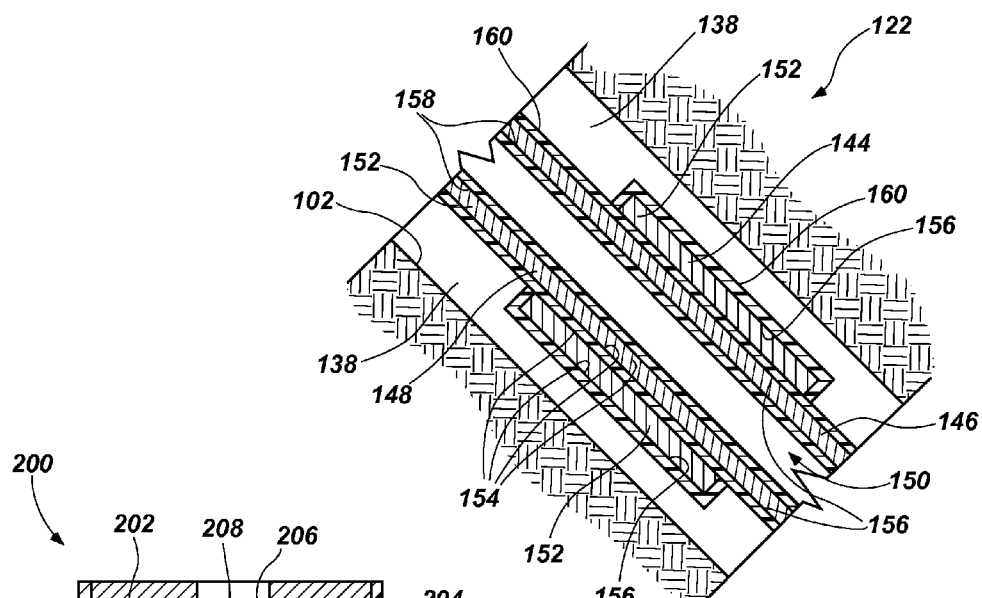
FIG. 1B is an insert view of a portion of the wellbore tool of FIG. 1A within dashed rectangle A.

For example, FIG. 1B illustrates, in cross-section, the portion of wellbore tool 122 of FIG. 1A located within dashed rectangular section A in FIG. 1A, in which coatings have been provided on certain surfaces of tool bodies 152. For ease of illustration, internal workings within the central bore 150 of the wellbore tool 122 and of the tool bodies 152 are not shown. The wellbore tool 122 may include one or more tool bodies 152, such as an extendable element 144 circumscribing a non-rotating sleeve 148 through which the central bore 150 passes. Extendable element 144 may be an extendable probe or an extendable steering blade housing detectors. Extendable element 144 may be configured to enable moving of detectors toward the wall of the borehole 102. Alternatively, or additionally, MWD/LWD detectors may be included within the non-rotating sleeve 148.

The tool bodies 152 of the extendable element 144 and non-rotating sleeve 148 include body surfaces 154. For example, the wellbore tool segment 146 or the non-rotating sleeve 148 includes interior surfaces 158 and exterior surfaces 156. The extendable element 144 interfaces with the exterior surface 156 of the non-rotating sleeve 148. The extendable element 144 also includes an exterior surface 156 that may come into contact with return fluid 138 passing back uphole in the borehole 102.

The interior surface 158 and exterior surface 156 of the non-rotating sleeve 148 are provided with a coating 160, which may be formed in accordance with one or more of the aforementioned embodiments of methods for forming a coating. The exterior surface 156 of the extendable element 144 is also provided with a coating 160. The coating 160 on the exterior surface 156 of the extendable element 144 may be formed of the same or a different composition as the coating 160 on the exterior surface 156 of the non-rotating sleeve 148. Likewise, the coating 160 on the interior surface 158 of the non-rotating sleeve 148 may be of the same or different composition than the other coatings 160. The coatings 160 on the exterior surfaces 156 of each of the non-rotating sleeve 148 and extendable element 144 may be formulated to be abrasion, erosion and pressure resistant so as to discourage degradation of the coatings 160 during continued contact with return fluid 138 passing uphole to the annular space comprise the wellbore tool 122 and the wall of the borehole 102. The coating 160 on the interior surface 158 of the non-rotating sleeve 148 may be formulated to be hydrophobic or otherwise water-resistant so as to discourage degradation of the coating 160 during continued contact with drilling fluid 126 passing downhole through the central bore 150 of the wellbore tool 122.

Other components or surfaces of components within the drilling system 100 may also include coatings. Coatings may be provided on the entire exterior surface or interior surface of a component or on only portions of a surface, interior and/or exterior, of a component or tool.

Figure 2:
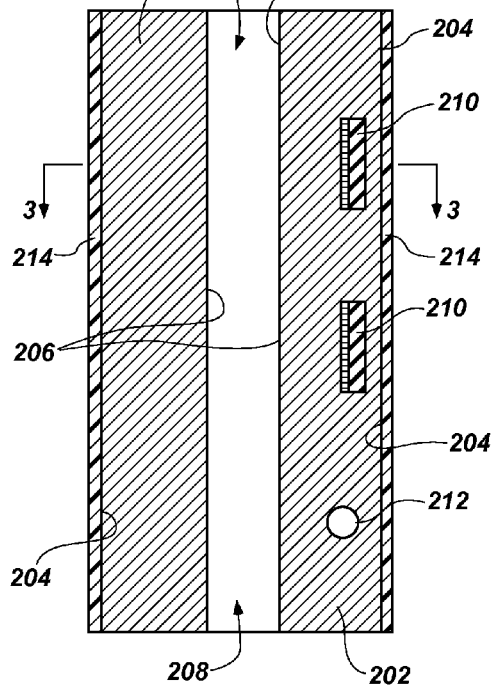
FIG. 2 is a cross-sectional view of a wellbore tool segment having a coating in accordance with a second embodiment of the present disclosure.

FIG. 2 depicts another example of a wellbore tool provided with a coating, which may be formed in accordance with any of the aforementioned coating methods utilizing a composition in accordance with any of the aforementioned compositions. Tool segment 200 may comprise a segment from the lower drill collar BHA 120 shown in FIG. 1. The tool segment 200 includes a cylindrical tool body 202 having a central bore 208 configured to allow drilling fluid 126 to flow through the tool segment 200. The tool segment 200 may be configured for use in a MWD/LWD system. The tool segment 200 includes a pulsed neutron source 212 disposed in the tool body 202 and one or more detectors 210 disposed in the tool body 202 for detecting gamma rays resulting from scattering by nuclei in the earth formation of neutrons from the pulsed neutron source 212.

The tool body 202 includes both an exterior surface 204 and an interior surface 206. The interior surface 206 defines and borders the central bore 208 passing through the tool segment 200. A coating 214 is provided along the exterior surface 204. The interior surface 206 of the tool body 202 is not provided with a coating 214. The coating 214 may be formed in accordance with any of the aforementioned methods for forming a coating using a composition in accordance with any of the aforementioned compositions.

Figure 3:
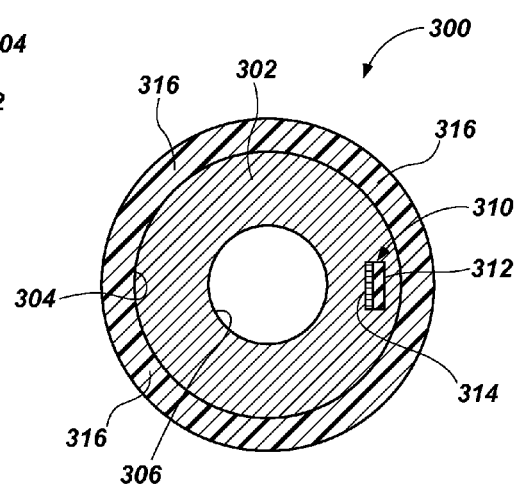
FIG. 3 is a cross-sectional view of a wellbore tool segment having a coating in accordance with a third embodiment of the present disclosure, taken along a section line like that of Section Line 3-3 in FIG. 2.

FIG. 3 depicts another example of a wellbore tool provided with a coating. The illustrated tool segment 300 may be the same tool segment depicted in FIG. 2, viewed directed along a central bore 308, like the central bore 208 shown in FIG. 2 along line segment 3-3. A detector 310, such as one of the detectors 210 shown in FIG. 2, includes a substantially planar detection surface 312 oriented outwardly with respect to the central bore 308 and a substrate 314. The tool body 302 of the tool segment 300 includes an exterior surface 304 and interior surface 306, the interior surface 306 bordering the central bore 308, and the exterior surface 304 directed toward the wall of the borehole 102 in which the tool segment 300 may be disposed. A coating 316 is provided along the entirety of the exterior surface 304 of the tool segment 300. Relative to the embodiment depicted in FIG. 2, the embodiment depicted in FIG. 3 includes a thick coating 316. The thick coating 316 may be formed using any of the aforementioned methods for forming a coating including a composition of any of the aforementioned compositions. The coating 316 may be foamed in a single application of such a composition, in multiple applications of the composition, and/or in multiple layers of differing compositions.

Figure 4:
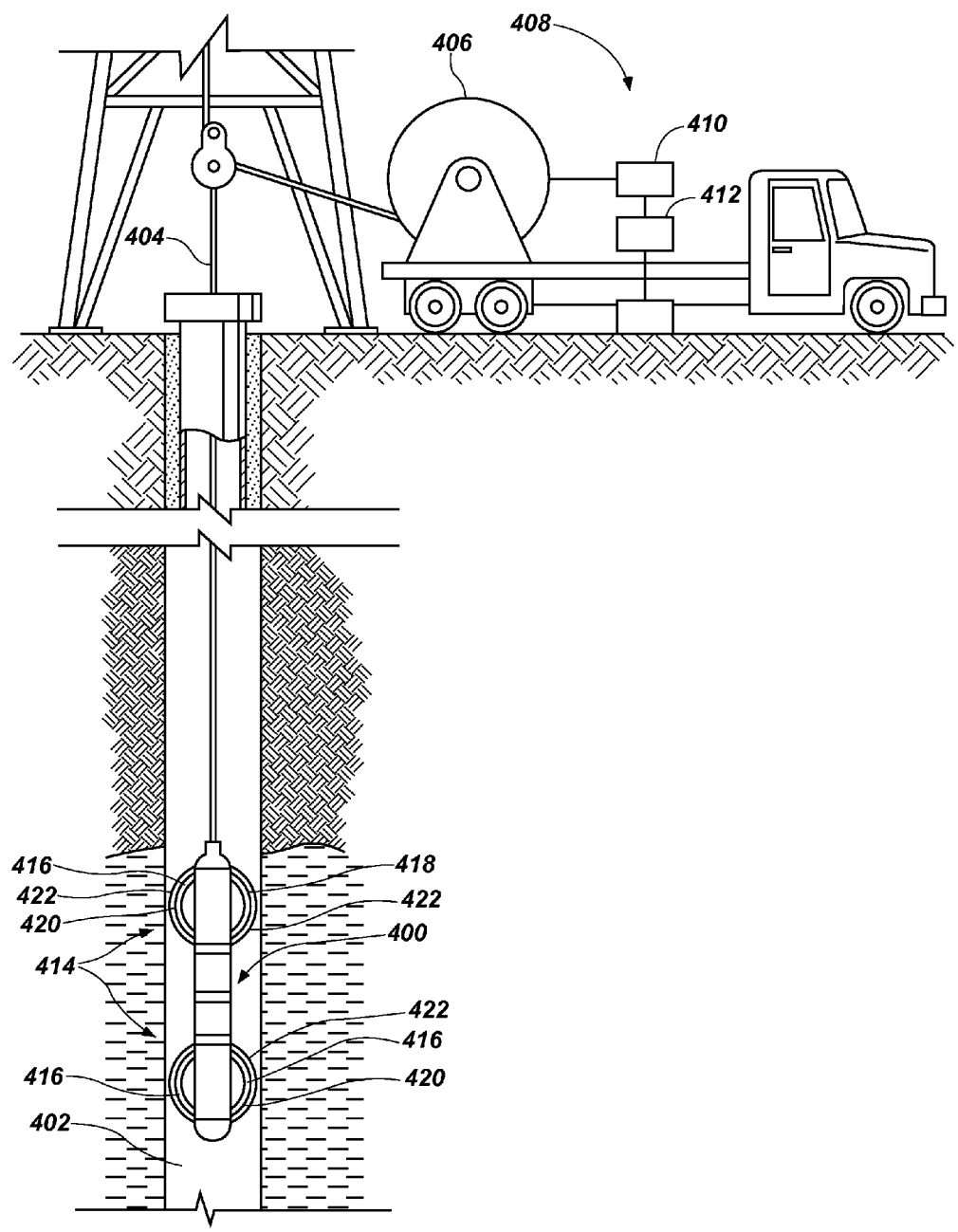
FIG. 4 is a schematic of a drilling system including a wellbore tool having a coating in accordance with a fourth embodiment of the present disclosure.

FIG. 4 depicts another example of a wellbore tool provided with a coating. Illustrated is a wellbore monitoring system, including a well logging instrument 400 configured for detecting a parameter or condition in a downhole location. The well logging instrument 400 is shown being lowered into a wellbore 402 penetrating earth formations. The well logging instrument 400 may be lowered into a wellbore 402 and withdrawn therefrom by an armored electrical cable 404 conventionally termed, as noted above, a wireline. The cable 404 can be spooled from a winch 406 or the like. The cable 404 is electrically connected to a conventional surface recording system 408. The surface recording system 408 may include a signal decoding and interpretation unit 410 and a recording unit 412. Signals transmitted by detectors 414 within the well logging instrument 400 may be decoded, interpreted, recorded, and processed by the respective units in the surface recording system 408. The well logging instrument 400 may additionally or alternatively include downhole data processors.

The detectors 414 of the well logging instrument 400 have body surfaces 418, including as exterior surfaces 420 configured to interact with the wall of the wellbore 402. For example, the exterior surfaces 420 of the detectors 414 may be configured to detect the diameter of the wellbore 402. As shown in FIG. 4, the exterior surfaces 420 may be provided with coatings 422. Therefore, in repeated interaction between the detectors 414 and the wellbore 402, marring or other damage to the exterior surfaces 420 of detectors' tool bodies 416 will be discouraged. Other components or surfaces of components within the well logging instrument 400 and system may also be provided with coatings 422.

Figures 5A, 5B:
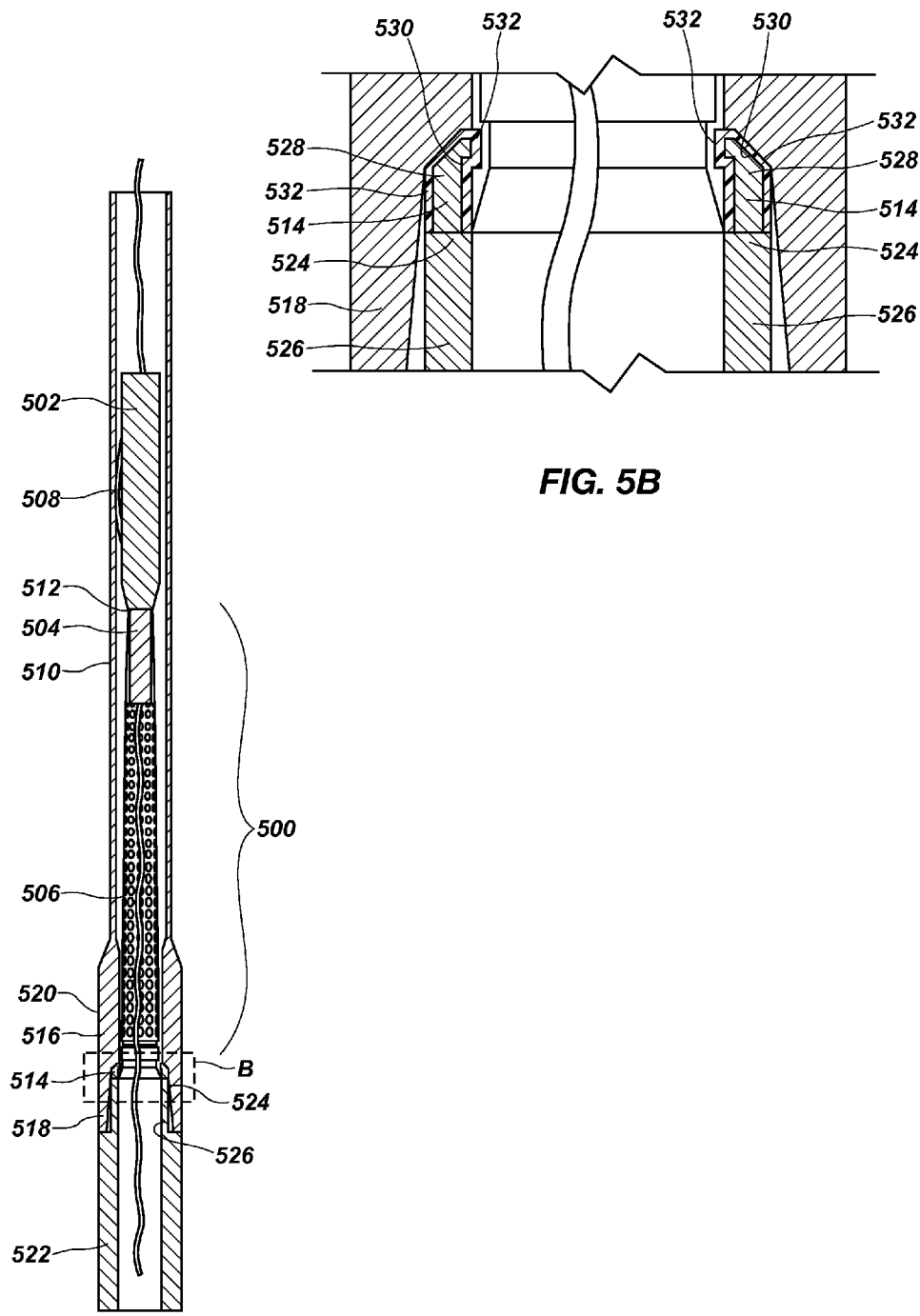
FIG. 5A is a schematic of a wellbore tool having a coating in accordance with a fifth embodiment of the present disclosure.
FIG. 5B is an insert view of a portion of the wellbore tool of FIG. 5A within dashed rectangle B.

FIGS. 5A and 5B depict still another example of a wellbore tool provided with a coating. FIG. 5A illustrates a MWD/LWD communication line system, and FIG. 5B illustrates an enlarged portion of FIG. 5A within rectangular section bounded by broken lines and designated by reference element B. The system includes at least one MWD/LWD tool segment 500. The MWD/LWD tool segment 500 includes a cartridge 502 at a downhole end of the MWD/LWD tool segment 500, a releasable communications connector 504 in operable communication with the cartridge 502, and mud screen 506 that is coaxially disposed about the communications connector 504 and affixed to the cartridge 502 at an uphole end of the cartridge 502. The cartridge 502 includes a position retention feature 508, such as a bow spring. The position retention feature 508 is configured both to temporarily maintain the position of the cartridge 502 relative to tubing 510, while the tubing 510 is being added to the system at the surface for continued drilling operation, and to assist in retaining the position of the cartridge 502 relative to the tubing 510 after deploying components of the MWD/LWD tool segment 500 within the borehole. One or more surfaces of the position retention feature 508 may be provided with a coating in accordance with this disclosure.

The cartridge 502 is connected to the mud screen 506 via an interface 512. The interface 512 may include an annular threaded connection, a series of bolts or pins, a welded connection, or the like. An electrical connection is also provided between an uphole end of the cartridge 502 and a wire section to be deployed within the borehole. The electrical connection may be provided by the communications connector 504 and may include a blade connection, a pin connection, or the like. The surfaces accomplishing these connections may be provided with a coating in accordance with this disclosure.

The mud screen 506 includes a shoulder ring 514 at an uphole end thereof that is configured and dimensioned to be receivable in a boreback section 516 of a box thread 518 at an uphole end 520 of a section of drill pipe 522. The shoulder ring 514 nests in boreback section 516 and is retained therein by a leading edge 524 of thread 526 of the next uphole drill pipe 522 section.

With reference to FIG. 5B shoulder ring 514 defines a tool body 528 with a body surface 530. The body surface 530 of the shoulder ring 514 is configured to interface with a surface of the box thread 518. The body surface 530 of the shoulder ring 514 is provided with a coating 532. The coating 532 may be formed in accordance with any of the above-described methods for providing a coating upon a surface using a composition in accordance with any of the above-described compositions.

Other components or tools within the systems depicted in FIGS. 1A through 5B may also be provided with coating, including those components and surfaces positioned and used in frequent contact with drilling fluid, formation cuttings, formation fluid, high temperatures, and other harsh environmental elements.

Any of the aforementioned components may be used in accordance with the method for utilizing a wellbore tool in a subterranean formation. That method may include forming the wellbore tool having a body surface, forming a powder thermal composition comprising a high temperature thermoplastic polymer and a nonmetallic, nonconductive filler material; applying the powder thermal composition to at least a portion of the body surface of the tool; and disposing the tool in a borehole. Forming the tool may include forming a logging-while-drilling tool or a measuring-while-drilling tool, such as the tools and systems illustrated in FIGS. 1A through 5B. Forming the tool may include, more specifically, forming a sleeve such as the non-rotating sleeve 148 of the drilling system 100 depicted in FIGS. 1A and 1B. Forming the tool may include forming a shoulder ring having a ring surface, such as the shoulder ring 514 having its body surface 530 depicted in FIGS. 5A and 5B.

The method may further include pretreating the surface to be coated as by texturizing the surface. A powder thermal spray composition as disclosed may grip deep into the imperfections of the surface to which it is applied, and increasing the imperfections of the surface to which it is applied may enhance the adhesion of the thermal spray coating. Texturizing the surface to increase the imperfections of the surface may include degreasing or otherwise cleaning the surface. Sandblasting or grit blasting may also be employed, followed by cleaning. Degreasing and cleaning may make the imperfections already on the surface more available for bonding to the thermal composition by removing hydrocarbon material and other deposits and debris from these imperfections as well as eliminating any chemicals that might interfere with the chemical bonding of the thermal spray composition to the body surface. The sandblasting or grit blasting may increase the imperfections of the surface to be treated allowing the thermal spray to adhere deep into the imperfections on the surface. Chemical methods for cleaning and degreasing the surface may be used. Pre-coatings may alternatively or additionally be applied to pre-treat the surface before application of the composition. Such pre-coatings may include one or more pre-coatings applied by any conventional coating technique, including, without limitation, physical or chemical vapor deposition, thermal spraying, dip coating, etc. Pre-coatings may be configured to enhance adhesion of the composition to the body surface, to reduce thermal stresses, or to deliver additional corrosion, abrasion, or erosion protection. Alternatively or additionally, other conventional surface-texturizing techniques may be used to pre-treat the surface before application of the composition upon the surface. The average surface roughness, Ra, of the tool surface may be at least 5 micrometers, for example, about or equal to 10 micrometers, following the texturizing.

Additional non-limiting embodiments of the disclosure are described below.

Embodiment 1

A composition, comprising a high temperature thermoplastic polymer; and a filler material; wherein the high temperature thermoplastic polymer comprises 10 weight percent to 99.9 weight percent of the composition; and the filler material comprises 0.1 weight percent to 90 weight percent of the composition.

Embodiment 2

The composition of embodiment 1, wherein the composition is a thermal spray composition.

Embodiment 3

The composition of embodiment 1 or 2, wherein the composition is a powder having an average particle diameter of less than or equal to 250 micrometers.

Embodiment 4

The composition of embodiment 3, wherein the average particle diameter of the powder composition is about 180 micrometers.

Embodiment 5

The composition of any of embodiments 1 through 4, wherein the high temperature thermoplastic polymer comprises polytetrafluoroethylene in about 88 weight percent to 98 weight percent of the composition; and the filler material comprises polyphenylene sulfone in about 2 weight percent to 12 weight percent of the composition.

Embodiment 6

The composition of any of embodiments 1 through 4, wherein the high temperature thermoplastic polymer comprises polyetheretherketone in about 10 weight percent to 99.5 weight percent of the composition; and the filler material comprises aluminum oxide in about 0.5 weight percent to 90 weight percent of the composition.

Embodiment 7

The composition of any of embodiments 1 through 4, wherein the high temperature thermoplastic polymer comprises polyetheretherketone in about 70 weight percent to 90 weight percent of the thermal spray composition; and the filler material comprises boron nitride in about 10 weight percent to 30 weight percent of the composition.

Embodiment 8

The composition of any of embodiments 1 through 4, wherein the high temperature thermoplastic polymer comprises polyethersulfone.

Embodiment 9

The composition of any of embodiments 1 through 4, wherein the filler material comprises a filler material having a glass transition temperature greater than the melting point of the high temperature thermoplastic polymer.

Embodiment 10

The composition of any of embodiments 1 through 4, wherein the filler material comprises a filler material having a glass transition temperature greater than or equal to about 350 degrees Celsius.

Embodiment 11

The composition of embodiment 10, wherein the filler material having the glass transition temperature of greater than or equal to about 350 degrees Celsius is polyphenylene sulfone.

Embodiment 12

The composition of any of embodiments 1 through 4 and 9 through 11, wherein the filler material comprises polyphenylene sulfone in about 1 weight percent to 10 weight percent of the composition; and boron nitride in about 1 weight percent to 10 weight percent of the composition.

Embodiment 13

The composition of any of embodiments 1 through 12, further comprising a fullerene.

Embodiment 14

The composition of any of embodiments 1 through 13, further comprising a micro-encapsulated material.

Embodiment 15

The composition of embodiment 14, wherein the micro-encapsulated material comprises micro-encapsulated graphite lubricant.

Embodiment 16

A method for forming a coating upon a wellbore tool, comprising forming a powder composition comprising a thermoplastic polymer and a filler material; and applying the powder composition on a body surface of the wellbore tool.

Embodiment 17

The method of embodiment 16, further comprising texturizing the body surface to an average surface roughness of at least 5 micrometers.

Embodiment 18

The method of any of embodiments 16 and 17, further comprising heating at least one of an exterior surface and an interior surface of a wellbore tool configured for logging or measuring data during drilling operations; and applying the powder composition on at least one of the interior surface and the exterior surface of the wellbore tool.

Embodiment 19

The method of any of embodiments 16 through 18, wherein forming the powder composition comprises liquefying the thermoplastic polymer; and adding the filler material to the liquefied thermoplastic polymer.

Embodiment 20

The method of any of embodiments 16 through 18, wherein forming the powder composition comprises agglomerating the thermoplastic polymer and the filler material.

Embodiment 21

The method of any of embodiments 16 through 18, wherein forming the powder composition comprises physically mixing the thermoplastic polymer with a nonmetallic filler material.

Embodiment 22

The method of any of embodiments 16 through 21, wherein forming the powder composition comprises forming a powder composition with an average particulate size between 150 micrometers and 200 micrometers, inclusive.

Embodiment 23

The method of any of embodiments 16 through 22, further comprising heating the body surface to a temperature no lower than ten degrees Celsius below the melting point of the thermoplastic polymer.

Embodiment 24

The method of any of embodiments 16 through 23, wherein forming the powder composition comprises mixing the thermoplastic polymer and a lubricant filler material.

Embodiment 25

The method of any of embodiments 16 through 24, further comprising heating the body surface; wherein applying the powder composition on the body surface comprises flame spraying molten powder composition upon the body surface after heating the body surface.

Embodiment 26

The method of any of embodiments 16 through 24, further comprising heating the body surface; wherein applying the powder composition on the body surface comprises electrostatically dispersing the powder composition upon the body surface; and heating the body surface comprises heating the body surface to melt or sinter the powder composition.

Embodiment 27

The method of any of embodiments 16 through 24, further comprising forming a liquid coating mixture comprising the powder composition and a solvent; and heating the body surface; wherein applying the powder composition on the body surface comprises applying the liquid coating mixture on the body surface; and heating the body surface comprises heating the body surface to melt or sinter the powder composition.

Embodiment 28

A method of utilizing a wellbore tool in a subterranean formation, the method comprising forming a wellbore tool comprising a body surface; forming a powder composition comprising a high temperature thermoplastic polymer and a nonmetallic, nonconductive filler material; applying the powder composition to at least a portion of the body surface; and disposing the wellbore tool in a borehole.

Embodiment 29

The method of embodiment 28, wherein forming the wellbore tool comprising the body surface comprises forming a logging-while-drilling tool, or forming a measuring-while-drilling tool, comprising an exterior body surface.

Embodiment 30

The method of embodiment 28, wherein forming the wellbore tool comprising the body surface comprises forming a sleeve comprising the body surface.

Embodiment 31

The method of embodiment 28, wherein forming the wellbore tool comprising the body surface comprises forming a shoulder ring comprising a ring surface configured to interface with other components of the wellbore tool.

Embodiment 32

A wellbore tool comprising a body surface; and a coating covering at least a portion of the body surface, the coating comprising a high temperature thermoplastic polymer; and a filler material.

Embodiment 33

The wellbore tool of embodiment 32, wherein the body surface comprises a surface of a component within a logging-while-drilling system or a measuring-while-drilling system.

Embodiment 34

The wellbore tool of embodiment 32 or 33, further comprising a detector comprising the body surface.

Embodiment 35

The wellbore tool of any of embodiments 32 through 34, further comprising a shoulder ring comprising the body surface.

Although the foregoing description contains many specifics, these are not to be construed as limiting the scope of the present disclosure, but merely as providing certain embodiments. Similarly, other embodiments of the disclosure may be devised that do not depart from the scope of the present invention. For example, materials and techniques described herein with reference to one embodiment also may be provided in others of the embodiments described herein. The scope of the invention is, therefore, indicated and limited only by the appended claims and their legal equivalents, rather than by the foregoing description. All additions, deletions, and modifications to the disclosure, as disclosed herein, which fall within the meaning and scope of the claims, are encompassed by the present invention.

What is claimed is:

1. A method for forming a coating upon a wellbore tool, comprising:
    forming a powder composition comprising a thermoplastic polymer and a filler material; and
    applying the powder composition on a surface of the wellbore tool.

2. The method of claim 1, further comprising:
    heating at least one of an exterior surface and an interior surface of the wellbore tool;
    wherein applying the powder composition on a surface of the wellbore tool comprises applying the powder composition on at least one of the interior surface and the exterior surface of the wellbore tool.

3. The method of claim 2, wherein forming a powder composition comprises:
    liquefying the thermoplastic polymer; and
    adding the filler material to the liquefied thermoplastic polymer.

4. The method of claim 2, wherein forming a powder composition comprises agglomerating the thermoplastic polymer and the filler material.

5. The method of claim 2, wherein forming a powder composition comprises forming a powder composition with an average particulate size between 150 micrometers and 200 micrometers, inclusive.

6. The method of claim 2, wherein heating at least one of an exterior surface and an interior surface of the wellbore tool comprises heating the at least one of the exterior surface and the interior surface to a temperature no lower than ten degrees Celsius below a melting point of the thermoplastic polymer.

7. The method of claim 2, wherein forming a powder composition comprises mixing the thermoplastic polymer and a lubricant filler material.

8. The method of claim 2, further comprising:
forming a molten composition from the powder composition;
wherein applying the powder composition on at least one of the interior surface and the exterior surface comprises flame spraying the molten composition upon the at least one of the interior surface and the exterior surface after heating the at least one of the exterior surface and the interior surface.

9. The method of claim 2, wherein:
applying the powder composition on at least one of the interior surface and the exterior surface comprises electrostatically dispersing the powder composition upon the at least one of the interior surface and the exterior surface; and
heating at least one of an exterior surface and an interior surface comprises heating the at least one of the exterior surface and the interior surface to melt or sinter the powder composition.

10. The method of claim 2, further comprising:
forming a liquid coating mixture comprising the powder composition and a solvent;
wherein applying the powder composition on at least one of the interior surface and the exterior surface comprises applying the liquid coating mixture on the at least one of the interior surface and the exterior surface; and
wherein heating at least one of an exterior surface and an interior surface comprises heating the at least one of the exterior surface and the interior surface to melt or sinter the powder composition of the liquid coating mixture.

11. The method of claim 2, wherein applying the powder composition on at least one of the interior surface and the exterior surface of the wellbore tool comprises applying the powder composition on a surface of a component of a logging-while-drilling system or a measuring-while-drilling system.

12. The method of claim 2, wherein applying the powder composition on at least one of the interior surface and the exterior surface of the wellbore tool comprises applying the powder composition on a surface of a detector of the wellbore tool.

13. The method of claim 2, wherein applying the powder composition on at least one of the interior surface and the exterior surface of the wellbore tool comprises applying the powder composition on a surface of a shoulder ring of the wellbore tool.

14. The method of claim 2, wherein forming a powder composition comprising a thermoplastic polymer and a filler material comprises forming a powder composition comprising a high temperature thermoplastic polymer and the filler material, the high temperature thermoplastic polymer comprising 10 weight percent to 99.9 weight percent of the powder composition, and the filler material comprising 0.1 weight percent to 90 weight percent of the powder composition.

15. The method of claim 14, wherein forming a powder composition comprising a high temperature thermoplastic polymer and the filler material comprises:
providing a high temperature thermoplastic polymer comprising polytetrafluoroethylene in about 88 weight percent to 98 weight percent of the powder composition; and
providing a filler material comprising polyphenylene sulfone in about 2 weight percent to 12 weight percent of the powder composition.

16. The method of claim 14, wherein forming a powder composition comprising a high temperature thermoplastic polymer and the filler material comprises:
providing a high temperature thermoplastic polymer comprising polyetheretherketone in about 10 weight percent to 99.5 weight percent of the powder composition; and
providing a filler material comprising aluminum oxide in about 0.5 weight percent to 90 weight percent of the powder composition.

17. The method of claim 14, wherein forming a powder composition comprising a high temperature thermoplastic polymer and the filler material comprises:
providing a high temperature thermoplastic polymer comprising polyetheretherketone in about 70 weight percent to 90 weight percent of the powder composition; and
providing a filler material comprising boron nitride in about 10 weight percent to 30 weight percent of the powder composition.

18. The method of claim 2, wherein forming a powder composition comprising a thermoplastic polymer and a filler material comprises forming a powder composition comprising a high temperature thermoplastic polymer and a filler material having a glass transition temperature greater than a melting point of the high temperature thermoplastic polymer.

19. The method of claim 2, wherein forming a powder composition comprising a thermoplastic polymer and a filler material comprises forming a powder composition comprising the thermoplastic polymer and a filler material comprising polyphenylene sulfone in about 1 weight percent to 10 weight percent of the power composition and boron nitride in about 1 weight percent to 10 weight percent of the powder composition.

* * * * *